United States Patent [19]

Enders

[11] Patent Number: 4,468,275

[45] Date of Patent: Aug. 28, 1984

[54] TIRE BUILDING MACHINE

[75] Inventor: George E. Enders, Salem, Ohio

[73] Assignee: NRM Corporation, Akron, Ohio

[21] Appl. No.: 458,568

[22] Filed: Jan. 17, 1983

[51] Int. Cl.³ .......................................... B29H 17/22
[52] U.S. Cl. .................................. 156/401; 156/403; 156/417; 206/223
[58] Field of Search ............... 156/401, 403, 400, 394, 156/417-420, 131, 132; 137/269; 141/367; 206/223, 230, 303, 372, 446

[56] References Cited

U.S. PATENT DOCUMENTS 3,438,832 4/1969 Cantarutti ........................... 156/401
3,728,194 4/1973 Enders ................................. 156/400
4,302,274 11/1981 Enders ................................. 156/401

Primary Examiner—William A. Powell
Assistant Examiner—Thomas Bokan
Attorney, Agent, or Firm—Maky, Renner, Otto & Boisselle

[57] ABSTRACT

A tire building machine of the bead set, ply down, and dual bladder turn-up type includes a bladder clamping system which may be used greatly to broaden the size range capability of existing tire building machines without affecting or replacing a substantial portion of the bladder clamping system or adjacent machinery such as the ply down assembly. Thus, by maintaining an inventory of a reduced number of parts, a machine may more easily be converted to manufacture sizes of tires beyond its standard. This is accomplished by changing the configuration in clamping rings and front nose of the outer bladder only.

25 Claims, 5 Drawing Figures

TIRE BUILDING MACHINE

This invention relates generally as indicated to a tire building machine and more particularly to a tire building machine of the bead set, ply down, and dual bladder turn-up type which includes a bladder clamping system enabling the standard tire building machine to be converted much more readily to manufacture tires of different sizes.

BACKGROUND OF THE INVENTION

In tire building machines of the type seen in Cantarruti U.S. Pat. No. 3,438,832, Enders U.S. Pat. Nos. 3,728,194 and 4,302,274, or as sold by NRM Corporation of Akron, Ohio under the well-known Model Nos. 88C and 88D, dual bladders are employed at each end of a tire building drum to wrap the plys of the tire carcass around a bead which has been set against the turned-down plys at the end of the drum. A dual bladder assembly in the more conventional beaded bladder type which may comprise five or more clamping or air supply rings must normally be disassembled, replaced, and reassembled if the machine is to be converted from the manufacture of one size tire to another. This not only requires a substantial amount of disassembly and assembly time, but also requires the tire manufacturer to maintain a significant inventory of costly clamping and air supply rings for each size tire.

SUMMARY OF THE INVENTION

With the present invention, only the configuration of the outer bladder air supply ring is altered as is the diameter of the outer bladder clamping ring and the front bead or nose of the outer bladder is altered to provide a dual bladder turn-up for different size tires. With the present invention there is then provided a method and replacement kit for a tire building machine which enables that machine to build multiple tire sizes utilizing only one size finger ply down assembly, and one size inner bladder and associated clamping rings. Thus, the major portion of the bladder clamping assembly remains the same enabling quicker and less expensive conversion of the machine to different size tires. By changing the configuration and clamping means of the outer bladder front bead or nose only, there is provided a machine and method capability of manufacturing, for example, 17 and 18 inch tires on a standard 16 inch machine, or for example, sizes 18 inch and 19 inch tires on a standard 17 inch machine.

With the replacement parts or kit of the present invention, the standard tire building machines of a given size may much more readily and easily be converted with less cost to machines for making different size tires.

A principal object is then to provide a replacement parts kit for a ply down, bead set, and dual bladder turn-up type tire building machine enabling that machine to be more readily converted to produce tires of different sizes.

Another principal object is the provision of a method for building multiple tire sizes using such machines utilizing one size finger ply down assembly and one size inner bladder and associated clamping hardware.

Another important object is the provision of such machine wherein the configuration and clamping means of the outer bladder front bead or nose may be altered only to enable the tire building machine to manufacture tires of different sizes.

Still another object is the provision of the dual bladder turn-up tire building machine wherein the outer bladder air supply ring and the associated outer bladder clamping ring may be configured to accommodate outer bladder nose beads of differing diameter without altering the other bead of the outer bladder or the inner bladder or its associated clamping rings.

Yet a further object is the provision of a standard tire building machine which with simplified conversion will produce tires of up to two sizes larger while providing consistent and common tight wrapping of tire components without affecting adjacent machinery.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 3 is a fragmentary section illustrating the dual bladder turn-up, the bead set, and finger ply down in a standard or prior art machine;

DETAILED DESCRIPTION OF THE DRAWINGS

Figure 1:
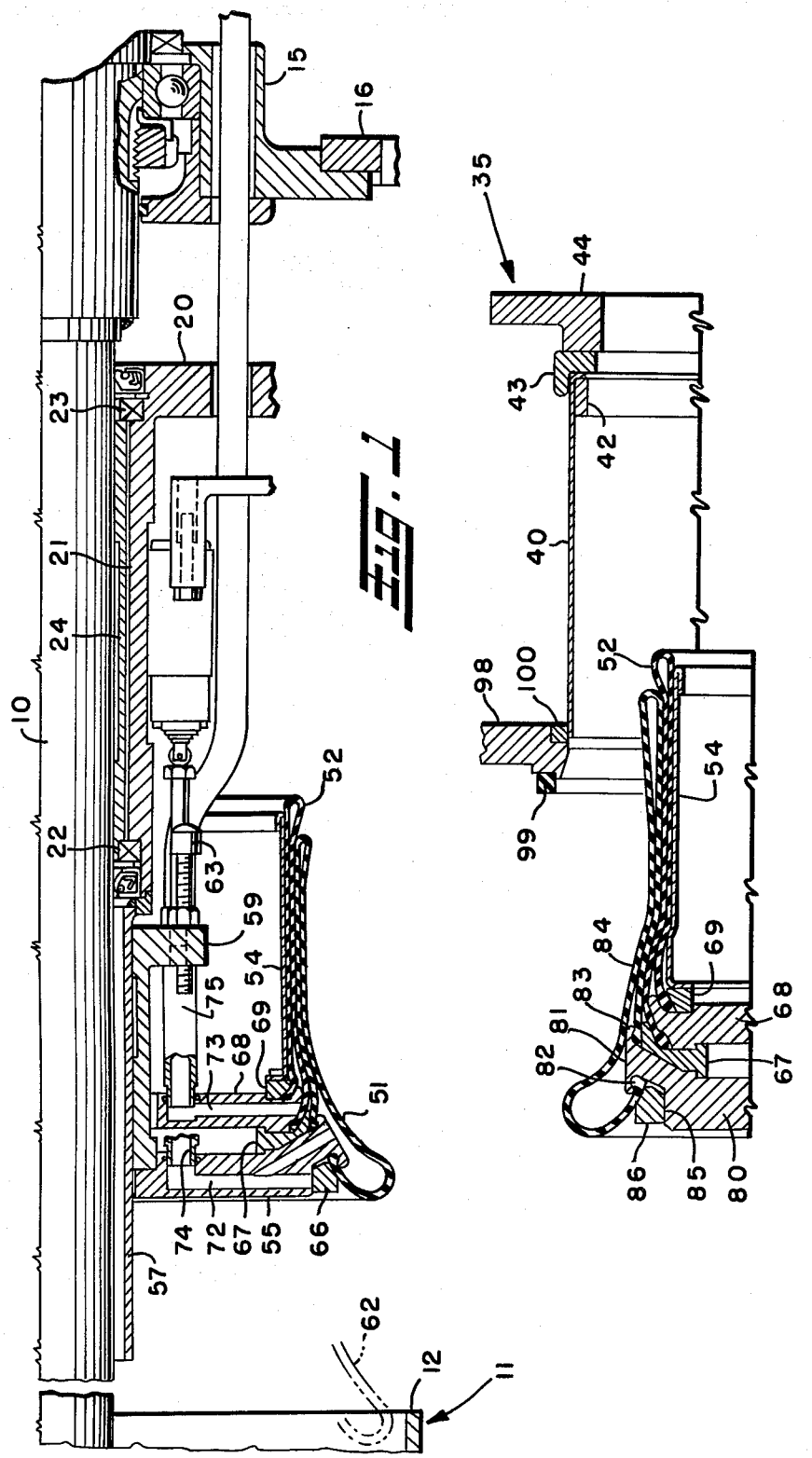
FIG. 1 is a fragmentary quarter section of one end of a tire building machine in accordance with the present invention.
Figure 2:
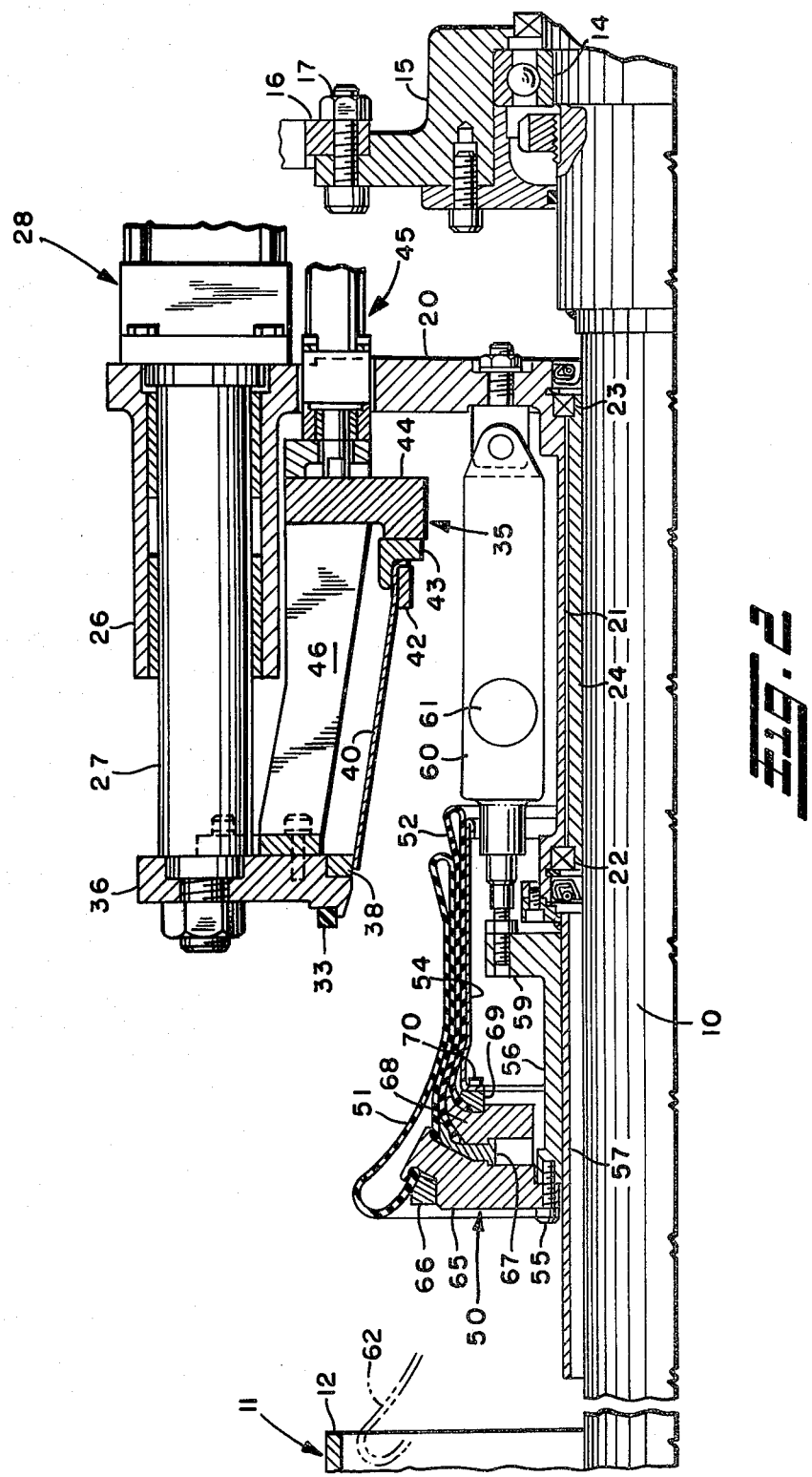
FIG. 2 is a similar quarter section of the diametrically opposite portion of the machine seen in FIG. 1 with certain parts shown rotated out of position.

Referring first to FIGS. 1 and 2 it will be seen that the machine is mounted on a shaft 10 which supports a tire building drum 11 for rotation, which drum is also driven for expansion and contraction from a set diameter to a collapsed position for removal of the tire carcass once it is formed thereon.

The shaft 10 at the tail stock end is journalled as indicated at 14 within flanged hub 15 which is secured to machine frame plate or casting 16. Suitable fasteners 17 secure the flanged hub in place.

Another plate 20 extends radially from the shaft 10 and includes a cylindrical extension 21 which is journalled as indicated at 22 and 23 on sleeve 24 on shaft 10. Thus, the shaft may rotate with respect to the plate 20.

The plate 20 includes a plurality of hubs 26 through which extend piston rods 27 of piston cylinder assemblies 28. The bead 33 is supported externally of the finger ply down assembly shown generally at 35 on a slight shelf of annular plate or ring 36 which is in turn mounted on the rods 27 for axial movement. The annular plate 36 may be fixed or it may be a series of ring segments radially adjustable. If fixed, the entire ring must be replaced to convert the machine to different size tires. If adjustable, the ring segments then need only be adjusted radially to convert the machine to different size tires.

It is noted that the ring 36 includes an inside wear ring 38 which engages the tip or outside of the array of spring fingers indicated at 40.

The spring fingers are clamped between two rings 42 and 43 which are in turn mounted on ring 44 which is moved axially by piston-cylinder assemblies 45 mounted on brackets 46 secured to the ring 36. In this manner, the piston-cylinder assemblies 28 move the entire bead set and ply down assembly while the piston-cylinder assemblies 45 move the ply down fingers with respect to the bead. The spring fingers 40 are designed to spring radially outwardly as they move out from under the wear ring 38 or to the left as seen in FIG. 2. They then move above the plies overhanging the end or shoulder 12 of the drum 11 and as the bead is then advanced to the set position the fingers contract radially wiping the plies downwardly over the drum shoulder. It should be noted that the cylinders 28 and 45 are shown rotated somewhat out of position in FIG. 2.

The dual bladder turn-up assembly is shown generally at 50 and includes an outer bladder 51 and an inner or underlying bladder 52. The bladders each include annular beads which are clamped together by a series of clamp and air supply rings, there being five such rings as illustrated. An axially extending cylindrical can 54 supports the bladders in their deflated condition as seen in FIG. 2. The entire assembly is secured by fasteners 55 to the end of sleeve 56 which is mounted on cylinder 57 concentric with the shaft 10, such cylinder being secured to and being an extension of the cylindrical extension 21.

The sleeve 56 includes a flange 59 which is connected to the plate 20 by one or more piston-cylinder assemblies and also the bladder lock assembly shown generally at 60. The bladder lock assembly includes simply a telescoping rod which has mounted thereon a pancake air cylinder 61 which pins to the rod to lock the bladder assembly in its extended position when it is positioned beneath the end of the drum 11 as shown by the phantom line position 62. When the bladders are inflated to wrap the plys around the bead, a significant axial force is exerted on the dual bladder assembly 50 and the bladder lock assembly maintains the assembly in proper position. As noted in FIG. 1, the flange 59 may also be provided with an adjustable stop 63 for the finger ply down assembly.

The beads of the outer bladder 51 are clamped on opposite sides of an outer air supply ring 65 by an outer clamping ring 66 and a center clamping ring 67. The beads of the inner bladder 52 are clamped between the center clamping ring, the inner air supply ring 68 and inner clamp ring 69, to which the can 54 is secured by the fasteners 70. As indicated more clearly in FIG. 1, the air supply rings 65 and 68 are provided with air passages 72 and 73, respectively which are connected to air lines 74 and 75, respectively.

Figure 4:
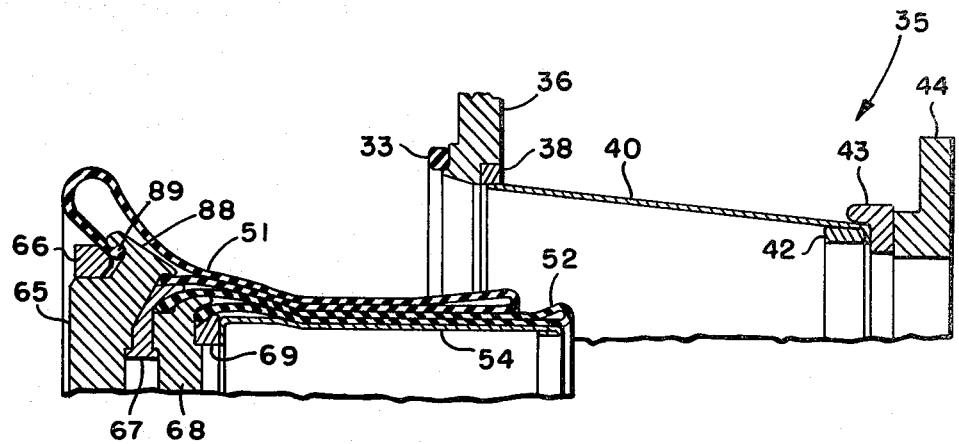
FIG. 4 is a view similar to FIG. 3, but illustrating the machine modified to construct a tire of the next larger size from the standard seen in FIG. 3.
Figure 5:
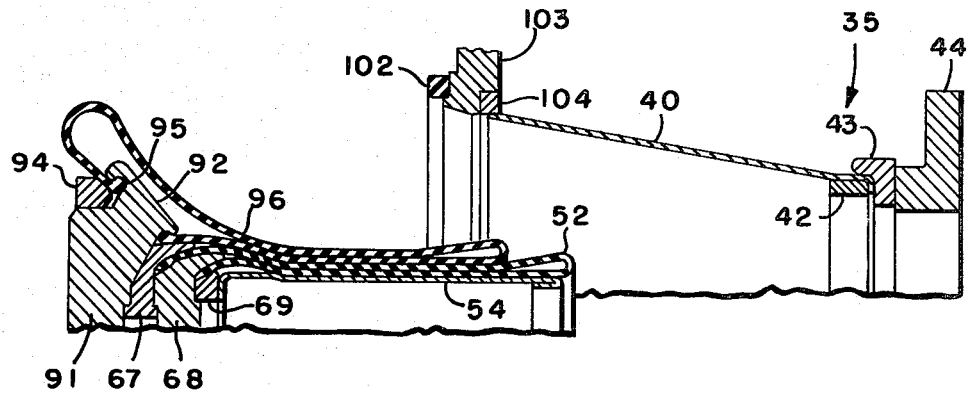
FIG. 5 is a view similar to FIGS. 3 and 4 illustrating the machine modified for the yet next larger size.

Referring now to FIGS. 3, 4 and 5, the conversion aspects of the machine will be more readily appreciated. FIG. 3 is the standard tooling for manufacturing of, for example, a 17 inch tire. FIG. 4 is the modification of that tooling for manufacturing a size larger tire or, for example, an 18 inch tire. The tooling of FIG. 4 corresponds to that of FIGS. 1 and 2. FIG. 5 is a modification of the tooling permitting manufacture of a yet further size larger or, for example, a 19 inch tire. All of the parts which are common are numbered the same. Only those parts which differ in dimension or configuration will now be described.

Referring first to all three Figures, namely, FIGS. 3–5, it will be seen that the finger ply down assembly 35 is in each case identical and that the components thereof are all the same. With regard to the dual bladder assembly, the same is also true of the center clamp ring 67, the inner bladder air supply ring 68, the inner clamp ring 69, the can 54 and the inner bladder 52. That much of the dual bladder assembly 50 is in each case identical.

Referring now initially to FIG. 3, it will be seen that the standard size dual bladder assembly for a 17 inch tire, for example, includes an outer air supply ring 80 which includes a right circular cylindrical outer surface 81 spacing the nose or front bead 82 and the inner bead 83 of bladder 84. The outer air supply ring is also provided with an annular shoulder 85 on which the outer clamp ring 86 is telescoped and mounted. The ring 86 and the supporting shoulder 85 are one size smaller than the ring 66 and the associated shoulder in the outer air supply ring 65 seen in FIG. 4. Also, it is noted that the outer surface of the air supply ring in FIG. 4 is conical as indicated at 88 in FIG. 4 and that the nose 89 of the outer bladder 51 is one size larger in diameter. The inner bead or the bead opposite the nose bead of the outer bladder in each instance is the same diameter and the bladder itself other than the enlarged front or nose for increasing sizes may be essentially the same. The conical surface 88 may be at an angle on the order of 32° with respect to the axis of the machine.

Moving on now to FIG. 5, the yet further larger size tooling includes an outer air supply ring 91 which includes an outer face 92 within the bladder which is quite steeply angled with regard to the axis of the machine providing the conical surface. Such angle may be on the order of 49°. The shoulder on the outer air supply ring 91 is again one size larger as is the clamping ring 94. The outer clamping rings 86, 66 and 94, while being of different diameters, may also be provided with somewhat altered internal beveled surfaces properly to clamp the nose bead of the outer bladder. The more steeply inclined conical surface 92 is, or course, required to enlarge the diameter of the nose bead 95 of the bladder 96 which is in that manner different from the bladders 51 of FIG. 4 and 84 of FIG. 3.

The only other tooling change for the machine, other than the drum itself, is in the diameter of the bead set ring. Referring first to FIG. 3, it will be seen that the bead set ring 98 is one size smaller in diameter than the bead set ring 36 of FIG. 4. The bead 99 itself is also one size smaller as is the wear ring 100. The bead 33 and bead set ring 36 of FIG. 4, is of course one size larger while the bead 102 and bead set ring 103 of FIG. 5 is still one size larger, as is the wear ring 104. Because of the nature of the spring fingers 40 it will be seen that they will nonetheless ride against the inside of the wear ring 100, 38 and 104 in each conversion.

It can now been seen that there is provided a method and apparatus for building multiple tire sizes utilizing in the tooling of a bead set, ply down, and dual bladder turn-up tire building machine only one size finger ply down assembly, and only one inner bladder and associated clamping hardware. This is accomplished by simply changing the configuration and clamping means of the outer bladder front nose only.

I claim:

1. A tire building machine of the bead set, ply down and dual bladder type comprising a dual bladder assembly including an inner and outer bladder assembly adapted to be positioned inside and near the end of a tire building drum, means to support said inner and outer bladders for inflation on said assembly, and means to alter the configuration of the outer bladder and its support only to enable the machine to manufacture tires of different size.

2. A tire building machine as set forth in claim 1 wherein said last mentioned means comprises a replacement outer bladder and an air inflation support therefor.

3. A tire building machine as set forth in claim 2 wherein the air inflation support is angled with respect to the axis of the machine.

4. A tire building machine as set forth in claim 3 wherein the angle of the air inflation support is proportional to the size tire being manufactured.

5. A tire building machine as set forth in claim 2 wherein said outer bladder has separate beads clamped against an air inflation ring, the diameter of the nose bead of the replacement outer bladder and its clamp being proportional to the size tire being manufactured.

6. A tire building machine as set forth in claim 5 wherein the separate beads of said outer bladder are clamped against an air supply ring, the outside of which is exposed to the inside of the outer bladder and which is angled with respect to the axis of the machine.

7. A tire building machine as set forth in claim 6 wherein each said replacement air supply ring provides a clamping surface for the nose bead of the outer bladder at a different diameter.

8. A tire building machine as set forth in claim 7 including a shoulder on each replacement air supply ring at a different diameter.

9. A tire building machine as set forth in claim 8 including a nose bead clamp ring mounted on the respective shoulder clamping the nose bead to the air supply ring.

10. A tire building machine as set forth in claim 1 including also a replacement drum and bead set ring for each size tire being manufactured, the machine otherwise remaining the same.

11. A tire building machine of the ply down, bead set and dual bladder turn-up type which includes a kit for converting the machine from manufacturing one size tire to manufacturing a different size tire, such kit comprising at least one air supply ring of different configuration than that used to manufacture such one size tire for the outer bladder only.

12. A tire building machine as set forth in claim 11 wherein such kit includes two such air supply rings, one of a tire size larger than the other.

13. A tire building machine as set forth in claim 11 wherein such kit includes at least one outer bladder of different configuration than that used to manufacture such one size tire.

14. A tire building machine as set forth in claim 13 wherein said outer bladder is of the bead type.

15. A tire building machine as set forth in claim 14 wherein the nose bead of said bladder is a larger diameter than the other.

16. A tire building machine as set forth in claim 15 including a second outer bladder having a nose bead of a yet larger diameter.

17. A tire building machine as set forth in claim 11 wherein said air supply ring includes two outer bladder bead clamping surfaces, the bead clamping surface of the nose bead of the outer bladder being of a larger diameter than the other.

18. A tire building machine as set forth in claim 17 including a conical surface between the bead clamping surfaces on said air supply ring adapted to be exposed to the interior of the outer bladder.

19. A tire building machine as set forth in claim 18 including a second air supply ring including two bead clamping surfaces, the bead clamping surface of the nose bead of the outer bladder being of a size larger than the corresponding clamping surface of the first air supply ring.

20. A tire building machine as set forth in claim 19 including a conical surface between the bead clamping surfaces on said second air supply ring of a steeper angle than the conical surface of the first air supply ring.

21. A tire building machine as set forth in claim 20 wherein the nose bead clamping surface of the first and second air supply rings are of a first and second larger diameter than the other bead clamping surface, such other bead clamping surface being for each the same diameter.

22. A tire building machine as set forth in claim 20 wherein the conical surfaces of the first and second air supply rings are inclined on the order of 32° and 49° with respect to the axis of the machine, respectively.

23. A tire building machine of ply down, bead set and dual bladder turn-up type which includes a kit for converting the machine from manufacturing one size tire to manufacturing a different size tire, such kit comprising at least one air supply ring of different outside configuration than that used to manufacture such one size tire for the outer bladder of the dual bladder assembly only.

24. A tire building machine as set forth in claim 23 wherein such kit includes at least one outside bladder of different configuration corresponding to the air supply ring.

25. A tire building machine as set forth in claim 24 wherein the outside bladder is of the bead type and includes a nose bead of a diameter corresponding to the converted tire size, the air supply ring clamping the nose bead.

* * * * *